Dec. 27, 1966 W. H. COULTER ETAL 3,295,059
PARTICLE STUDYING DEVICE PULSE ANALYZER
Original Filed Aug. 19, 1959 2 Sheets-Sheet 1
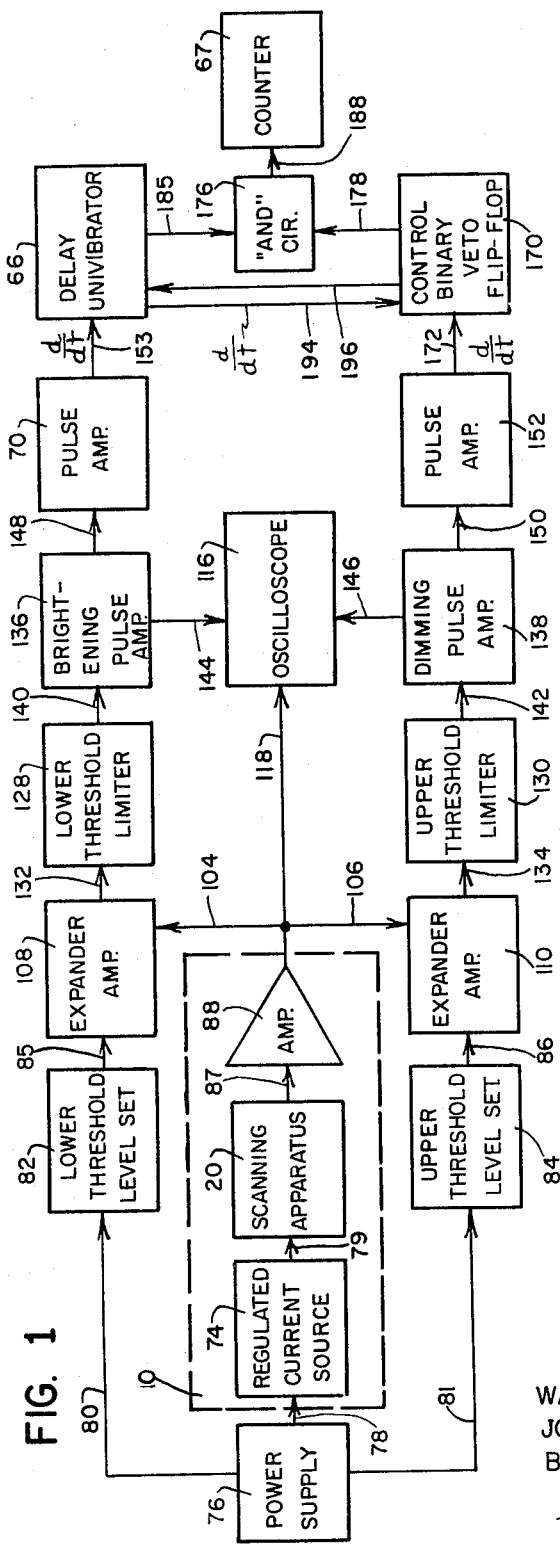
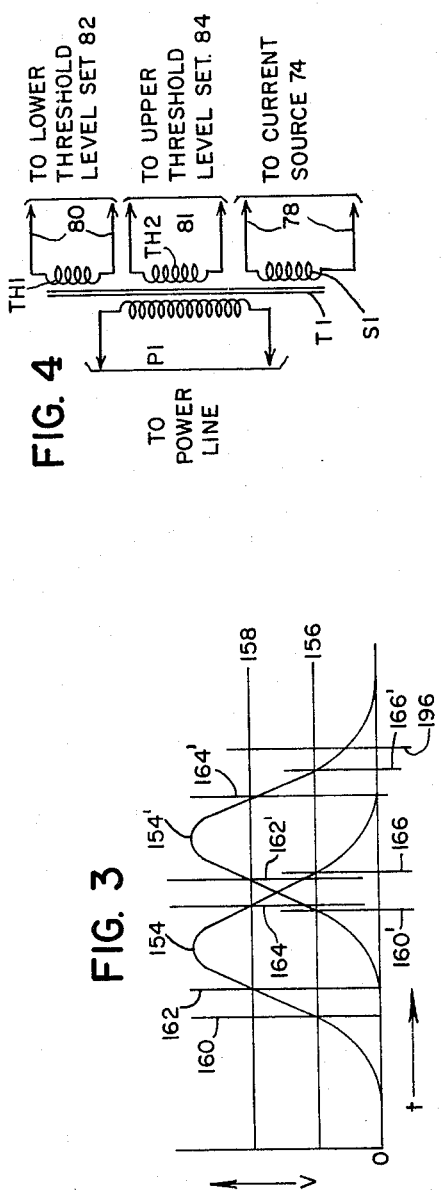
Inventors
WALLACE H. COULTER, WALTER R. HOGG,
JOSEPH P. MORAN & WILLIAM A. CLAPS.
BY Silverman & Cass
ATTYS.

United States Patent Office 3,295,059
Patented Dec. 27, 1966

3,295,059
PARTICLE STUDYING DEVICE PULSE ANALYZER
Wallace H. Coulter, Miami Springs, and Walter R. Hogg, Hialeah, Fla., Joseph P. Moran, Chicago, Ill., and William A. Claps, Hialeah, Fla., assignors to Coulter Electronics, Inc., Chicago, Ill., a corporation of Illinois
Original application Aug. 19, 1959, Ser. No. 834,860, now Patent No. 3,259,842, dated July 5, 1966. Divided and this application June 28, 1965, Ser. No. 467,406
5 Claims. (Cl. 324—71)

This application is a division of our copending application Serial No. 834,860, filed August 19, 1959, entitled Particle Analyzing Device, now Patent No. 3,259,842.

This invention relates to an electronic pulse analyzer which is particularly adapted for analyzing pulses generated by scanned particles in a particle studying device wherein the respective amplitudes of the pulses are a function of the respective sizes of the scanned particles.

The embodiment of the pulse analyzer to be described will be shown in combination with a particle studying device constructed to operate on the Coulter principle which is taught in U.S. Patent 2,656,508. This invention is an improvement over the pulse analyzers previously used in particle studying devices such as the commercially available device known under the registered trademark "Coulter Counter" and manufactured by Coulter Electronics, Inc. of Hialeah, Florida.

The pulse analyzer which is incorporated into the commercially available "Coulter Counter" is of the single threshold level detector type. It provides a structure for distinguishing between pulses whose amplitudes are above a certain threshold level and pulses whose amplitudes are below that level. By varying the level and recording the number of the particles which exceed the size determined by the level, the operator can construct a cumulative frequency polygon. With extensive calculation, the operator can convert these data into a general frequency histogram which, in many cases, provides a more meaningful display of information.

Accordingly, it is a primary object of this invention to provide means, incorporating a pair of upper and lower threshold level detecting circuits, for enabling the operator of a particle studying device to determine directly the frequency of occurrence of particles having sizes within a given range so as to enable him to prepare a general frequency histogram without first having to construct a cumulative frequency polygon.

Because the determination of pulse amplitude must be made accurately and quickly, the upper and lower threshold level detecting circuits must be cooperatively connected so that the combination may generate an appropriate count or no-count signal.

Accordingly, another primary object of this invention is to provide means for rendering the counting circuit inoperative when the amplitude of the signal pulse is not within the range determined by the threshold levels and for rendering the counting circuit operative when the amplitude of the signal pulse is within the range determined by the threshold levels.

Another object of this invention is to provide means for generating an allow pulse when the amplitude of the signal pulse exceeds the lower threshold level and for generating a veto pulse when the amplitude of the signal pulse exceeds the upper threshold level.

A further object of this invention is to provide means for determining from the presence of an allow pulse or a veto pulse when a count pulse should be transmitted to the counting circuit.

Another object of this invention is to provide means for preventing the counting of pulses having amplitudes in excess of the upper threshold level which occur in rapid succession.

Another object of this invention is to provide means for distinguishing the range of pulse sizes which will be counted on a visual display.

Another feature of this invention is to provide means for automatically adjusting the threshold levels to compensate for changes in power supply voltages and other variables.

These and other objects and advantages of the invention will be more clearly understood from a detailed description of the preferred embodiment set forth below. The drawings are primarily diagrammatic and symbolic in nature in order to keep the description concise and intelligible, as those skilled in the art are familiar with many of the specific circuits which are suitable for constructing the combinations to be described.

In the drawings in which like or equivalent elements have the same reference numerals:

FIG. 1 is a block diagram of a particle studying device incorporating the invention;

FIG. 3 is a graph of two large pulses having amplitudes which exceed the upper threshold level which occur in rapid succession; and FIG. 4 is a diagram of part of the power supply circuit.

Figure 2:
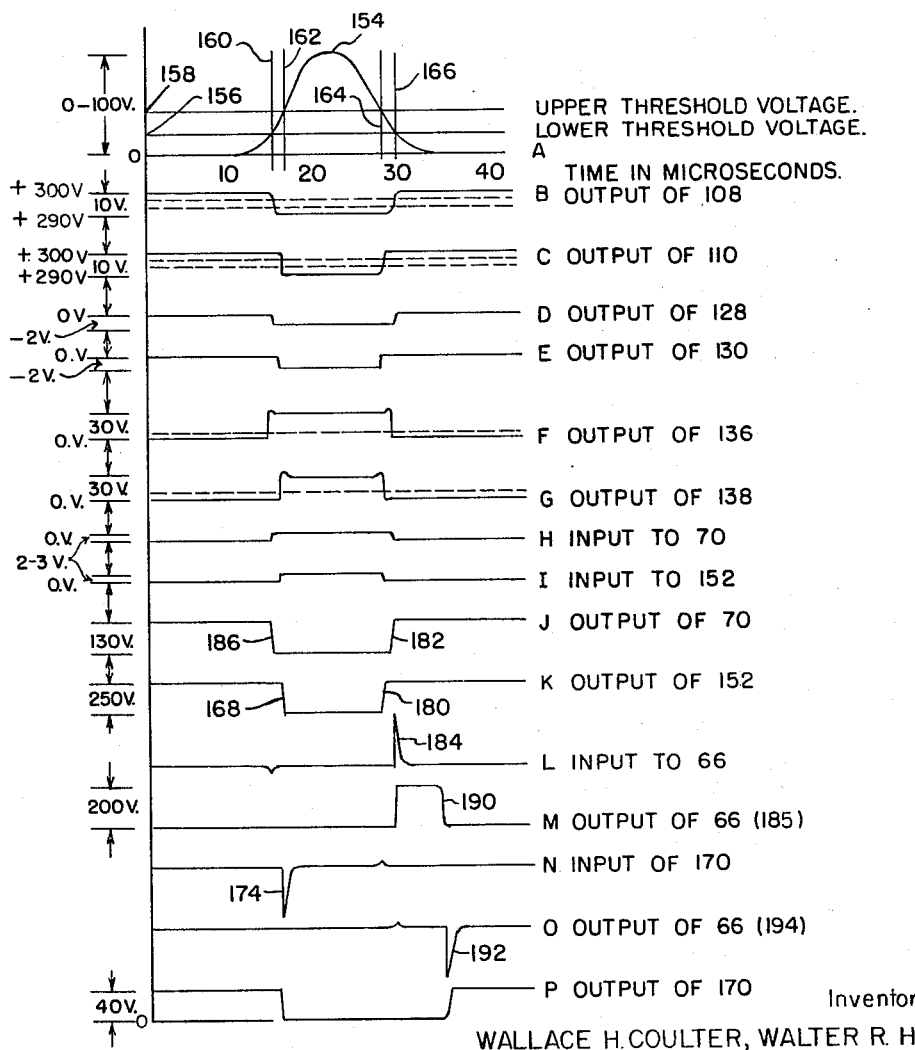
FIG. 2 is a graph of a series of waveshapes of signals found in the circuits of the invention.

A preferred embodiment of the invention adapted for use with a particle studying device of the Coulter type is shown in block diagram representation in the drawing of FIG. 1.

The basic Coulter-principle particle studying transducer structure is enclosed in the box 10. This embodiment of the transducer structure is disclosed in the parent application Serial No. 834,860, now Patent No. 3,259,-842. The basic transducer structure comprises a scanning apparatus 20, which may be of the type described in U.S. Patent No. 2,869,078, having a pair of scanning electrodes connected to both a regulated current source 74 by channel 79 and an amplifier 88 by channel 87.

The current source 74 is of the type which generates an output current of a magnitude which is a function of the input signals it receives. One input signal is received from the operator who chooses the range of current magnitude required to obtain a good output signal. The other input signal is transmitted through channel 78 from a power supply 76 which may supply power to the current source 74 and to other parts of the circuit as will be described. Any change in the power supply parameters, such as input power line voltage shifts, causes a change in the signal in channel 78 which in turn causes the magnitude of the output current to change to a new level within the range selected by the operator so that the effect of a change in power line voltage is compensated for.

The amplifier 88 is one which has a low input impedance and good response to pulse-like signals of the type generated by the passage of particles through the scanning apparatus 20.

The output signal of the amplifier 88 is transmitted to lower and upper expander amplifiers 108 and 110 through channels 104 and 106. Each of these expander amplifiers provides linear amplification only in a very small band, for example six volts, of the pulse received from the output of the amplifier 88.

The six volt band for the lower expander amplifier 108 is chosen by a lower threshold level set 82 which is connected to the expander amplifier through channel 85. Similarly an upper threshold level set 84 is connected to the expander amplifier 110 through channel 86 and determines the linear amplification band for the upper expander amplifier. The level sets 82 and 84, energized by the power supply 76 through channels 80 and 81, adjust the voltages on the cathodes of the tubes in the expander amplifiers in response to operator commands which determine the range of amplitudes of the signal pulses to be selected for studying or counting.

Each six volt portion of the pulse signal which has been selected is again amplified and transmitted through channels 132 or 134 to an appropriate lower or upper threshold limiters 128 or 130 where lower and upper threshold segments are selected.

Each expander amplifier has a gain of five. The threshold limiters are pairs of semiconductor diodes. Since any six volt portion of the output pulse may be used, the bias on the threshold limiters may be fixed. Each threshold limiter generates a substantially square pulse having an amplitude of about two volts, compared with the thirty volt output signal of the expander amplifier (six volts times gain of five). The lower square pulse is transmitted through channel 140 to a brightening pulse amplifier 136 and the upper square pulse is transmitted through channel 142 to a dimming pulse amplifier 138.

Brightening and dimming pulses are transmitted to the cathode ray intensity circuits of an oscilloscope 116 through channels 144 and 146 from the brightening pulse amplifier 136 and the dimming pulse amplifier 138. The vertical deflection circuit of the oscilloscope 116 is connected by channel 118 to the output of the amplifier 88 so that a graph of the pulse signals as a function of time is displayed on the screen. The signals from the brightening pulse amplifier and dimming pulse amplifier cause the trace to brighten as soon as the height of a pulse envelope appearing at the output of amplifier 88 exceeds the lower threshold as determined by the lower threshold level set 82 and to dim when the height of the same pulse exceeds the upper threshold level as determined by the upper threshold level set 84. In this manner, the range between the lower and upper threshold levels is visibly distinguished on the screen of the oscilloscope.

These circuits must be capable of passing pulses with a minimum of delay; otherwise, the brightening and dimming pulses applied to the oscilloscope 116 will not arrive with the proper time relationships. The gain of the brightening pulse amplifiers is about fifteen. The amplifiers provide a thirty volt pulse to the oscilloscope to brighten and dim the trace for the periods of time when the height of the signal pulse envelope is within and outside the range defined by the two threshold levels. The sharpness of the brightening and dimming pulses and the fast transmission time are achieved by making the bandwidth of the pulse amplifiers severl megacycles wide.

The output signals from the brightening and dimming pulse amplifiers 136 and 138 also are transmitted through channels 148 and 150 to appropriate pulse amplifiers 70 and 152. A network of diodes prevents the tubes of the pulse amplifiers 70 and 152 from drawing grid current and insures that small pulses are not lost. The pulse amplifiers 70 and 152 have a gain of about thirty. The result is that the original pulses from the expander amplifiers are substantially amplified.

After amplification in the pulse amplifiers 70 and 152, the pulses are transmitted through channels 153 or 172 to the counter logic circuit which comprises a delay univibrator 66, a control binary veto flip-flop 170, an "AND" circuit 176 and a counter 67.

The counter logic circuit is programmed to register a count only if the amplitude of a pulse exceeds the lower threshold but not the upper threshold. No count is registered if the amplitude of the pulse does not exceed the lower threshold or if the amplitude of the pulse exceeds the upper threshold.

As an aid in understanding the operation of the invention, reference may be had to FIG. 2 where the graphs of the signals which appear at various points in the circuit are shown.

A represents a signal pulse at the output of the amplifier 88 as it appears on channels 104, 106 and 118. It is shown as a positive-going pulse 154 having an amplitude which may be anywhere within the range between 1–100 volts. The pulse has a duration of about twenty microseconds. The voltage levels which are indicated at 156 and 158 are respectively the lower and upper threshold levels which define the range of sizes of the pulses which it is desired to study or count. The critical switching times occur at 160 when the height of the pulse envelope first exceeds the lower threshold level, at 162 when the height of the pulse envelope first exceeds the upper threshold level, at 164 when the height of the pulse envelope recedes below the upper threshold level, and at 166 when the height of the pulse envelope recedes below the lower threshold level.

The pulse 154 has an amplitude which exceeds the upper threshold level 158 and therefore it is desired that this pulse should not be counted. The circuit response to a "large" pulse will be described as this will also explain the response of the invention to smaller pulses.

The threshold level sets 82 and 84 are adjusted by the operator in accordance with his choice of magnitudes for the lower and upper threshold levels 156 and 158. The expander amplifiers now will amplify six volt portions of the pulse 154 in the vicinities of the lower and upper threshold levels 156 and 158. The output signal of the lower expander amplifier 108 is shown at B. The output signal of the upper expander amplifier 110 is shown at C. The amplitudes of the output signals B and C may be the same but their durations are different as the height of the envelope of the pulse 154 exceeds the lower threshold level for a longer time that it exceeds the upper threshold level.

Small portions, the segments between the dotted lines, of the pulses B and C are selected by the threshold limiters 128 and 130. These segments have amplitudes of about two volts but their durations also are different. The output of the threshold limiter 128 is shown at D. The output of the threshold limiter 130 is shown at E. Pulses D and E are applied to the inputs of the brightening and dimming pulse amplifiers 136 and 138 and are amplified to about thirty volts as shown at F and G. From these amplifiers, these amplified pulses are transmitted by channels 144 and 146 to the cathode ray beam intensity circuit of the oscilloscope 116 to cause the trace on the screen of the cathode ray tube to be brightened only when a portion of the envelope of the pulse 154 is in the range between the threshold levels 156 and 158. This is accomplished by using the lower threshold level signal F to brighten the trace and the upper threshold level signal G to dim the trace. Signal F may be applied to the cathode ray tube control grid and signal G may be applied to the cathode ray tube cathode.

A small portion of each of the signals F and C, between the base and the broken lines, is further amplified. These portions are shown at H and I. The lower threshold portion H is transmitted through channel 148 to the pulse amplifier 70. The upper threshold portion I is transmitted through channel 150 to the pulse amplifier 152.

The signals H and I have approximately the same amplitude but their durations are different for the reason stated above. The method of amplifying segments of the signals is used to insure that pulses whose amplitudes barely exceed a threshold level probably will be amplified sufficiently to trigger the univibrator 66 or the flip-flop 170 even though they may not cause brightening or dimming of the oscilloscope trace. This method makes the invention extremely sensitive to pulse amplitudes.

The lower threshold signal H is amplified by the pulse amplifier 70 and appears at the output as a 130 volt square pulse as shown at J. Similarly, the upper threshold signal I is amplified by the pulse amplifier 152 and appears at the output as a 250 volt square wave as shown at K. Both square waves are negative going.

The upper threshold signal K is transmitted to the veto flip-flop 170 through channel 172 in which it is differentiated with respect to time as indicated by the derivative symbol, $d/dt$. Differentiation of the signal K produces a signal N having a negative pulse 174 which occurs as a result of differentiating the leading edge 168 of the signal K. The trailing edge 180 pulse is suppressed or gated off because it is not used. The trigger pulse signal N is applied to the input of the veto flip-flop 170 with the pulse 174 occurring coincidently with the crossing of the upper threshold 158 by the leading edge of the envelope of the pulse 154.

The trigger pulse 174 causes the control binary veto flip-flop 170 to shift to the veto state and to produce an output signal P. The pulse P is negative going and is transmitted to the "AND" circuit 176 through channel 178.

The pulse P applied to the "AND" circuit disables the same by biasing the grid of a tube below cut-off so that there is no output signal from the "AND" circuit as long as there is a disabling input pulse such as the one shown at P. Recall, however, that the disabling pulse P was initiated by the crossing of the upper threshold level by the leading edge of the envelope of the pulse 154. If the upper threshold level had not been crossed, there would be no disabling input pulse P and signals applied to the other "AND" circuit input would appear at the "AND" circuit output.

Simultaneously, the lower threshold signal J is transmitted to the delay univibrator 66 through channel 153 in which it is also differentiated with respect to time. Differentiation of the signal J produces a signal L having a trigger pulse 184 which occurs as a result of differentiating the trailing edge 182 of the signal J. The leading edge 186 pulse is gated off because it is not used. The trigger pulse signal is applied to the input of the delay univibrator 66 with the pulse 184 occurring coincidently with the re-crossing of the lower threshold 156 by the trailing edge of the envelope of the pulse 154.

The trigger pulse 184 of the wave shape L is applied to the delay univibrator 66 to cause the generation of an output square wave as shown at M. This signal is transmitted through channel 185 to the other input of the "AND" circuit 176. If no disabling pulse is present at the input to the "AND" circuit, the signal M will pass through the "AND" circuit and appear at its output. The signal is then transmitted through channel 188 to a counter 67. This can only occur when the pulse 154 has an amplitude between the threshold levels 156 and 158.

In order to return the flip-flop 170 to its original state, the output pulse 190 of the univibrator 66 is differentiated in channel 194 and transmitted to an input of the control binary veto flip-flop 170. The leading edge pulse is suppressed as only the trailing edge pulse 192 of signal O is required to trigger the flip-flop out of the veto state after the passage of the pulse signal to the "AND" circuit.

Channel 196 transmits a signal from the flip-flop 170 to the univibrator 66 to disable the univibrator until the flip-flop has returned to its original state after having generated a pulse such as signal P. This feature is important from the standpoint of obtaining correct statistical determinations of the number of pulses counted.

Consider a dense population in which a very small number of pulses generated by scanned particles have amplitudes in the range between a given pair of threshold levels. The other pulses which have much larger amplitudes are not to be counted. If in using the apparatus a single unwanted pulse is counted, a substantial error is introduced into the count. This is especially true where the percentage of wanted pulses is less than one percent of the total.

The disabling of the univibrator 66 immediately following each large pulse signal will prevent an almost immediately following pulse from being counted irrespective of whether it is large or small. Because the number of the wanted particles is so small, the chances of not counting a wanted pulse because of the delay feature are very low and hence the error introduced is very low.

The graphs of the signals of FIG. 3 illustrate the problem through the use of pulses 154 and 154' which occur in rapid sequence. The critical times of crossing the thresholds are the same as for signal A of FIG. 2 except that each of the times for the pulse 154' is denoted by a prime ('). The crossing of the upper threshold 158 at time 162 controls the production of the trigger pulse 174 and the disabling or veto pulse P. Note that a second pulse 154' has appeared which also has an amplitude which exceeds the upper threshold level 158. Its time for causing the operation of the flip-flop 170 to produce a veto pulse is 162'; however, the time for generating the allow signal M for the first pulse is time 166 and the time for generating the restoring pulse O occurs shortly after time 166. But when the time 162' for initiating the production of a second trigger pulse 174' arrives, the flip-flop 170 is still producing a disabling pulse P. By the time the envelope of the pulse 154' crosses the lower threshold level, time 166', the flip-flop has been restored. Since the second trigger pulse 174' cannot operate the flip-flop 170, there will be a signal passing through the "AND" circuit. Therefore pulse 154' will be counted.

The structure which is used to prevent this effect is circuitry which disables the univibrator 66 after a large pulse such as 154 appears for the period of time necessary for the flip-flop 170 to return to its original state. During this period no allow pulses are generated by the univibrator 66. This time may extend to time 196 and thereby prevent the pulse 154' from causing a count when its envelope recrosses the threshold 156 at time 166'.

Statistical corrections ascertained by experiment and computation related to coincident passage of particles through the scanning apparatus 20 are normally applied to the count determination to minimize the effect of not counting wanted pulses in large populations.

In this invention the same supply voltage is used for the current source and both threshold circuits. Because of this, proportionality of the signals throughout the apparatus is maintained regardless of changes which occur in the power line voltage. In the block diagram of FIG. 1, this is shown by providing a common power supply 76 which serves as a power source for the current source 74 and both of the threshold level sets 82 and 84.

Referring now to the circuit diagram of FIG. 4, which is a diagram of part of the circuit of the power supply 76, a transformer T-1 is shown supplying the necessary power for the several components involved; namely, the current source 74 and the threshold level sets 82 and 84. A common source or transformer primary winding is shown at P-1. Threshold secondary windings are labeled T$h$-1 and T$h$-2. These windings are very closely coupled with a secondary winding S-1 connected to the current source 74 and with the primary winding P-1; preferably being wound as closely as possible and ideally interleaved upon the same portion of the core. Therefore any change in the voltage across any one of the windings causes changes in the voltages across all of the other windings.

It is immediately apparent that many variations in the circuits of the invention are possible. The nature of the invention has been disclosed in general terms to aid those skilled in the art to appreciate its broad scope and possibilities.

What it is desired to be secured by Letters Patent of the United States is:

1. A particle studying device for analyzing particles suspended in a liquid, comprising:
    (a) transducer means having a liquid suspended particle scanning apparatus for generating electrical pulses of amplitudes which are a function of the respective sizes of the respective particles which are scanned by the transducer;

(b) a lower expander amplifier having an input connected to the transducer output;

(c) lower threshold level set means for determining a lower threshold level, having an output connected to another input of the lower expander amplifier;

(d) a lower threshold limiter having an input connected to the lower expander amplifier output;

(e) delay univibrator means triggered when the height of a pulse drops below the lower threshold level for generating an allow pulse, having an input connected to the output of the lower threshold limiter;

(f) an upper expander amplifier having an input connected to the transducer output;

(g) upper threshold level set means for determining an upper threshold level, having an output connected to another input of the upper expander amplifier;

(h) an upper threshold limiter having an input connected to the upper expander amplifier output;

(i) control binary veto flip-flop means triggered into a veto state when the height of a pulse envelope exceeds the upper threshold level, having an input connected to the upper threshold limiter;

(j) an "AND" circuit having a first input connected to the output of the univibrator means and a second input connected to the output of the flip-flop means; and (k) a counter having an input connected to the "AND" circuit output.

2. A particle studying device as recited in claim 1 comprising in addition:

(a) means for visually displaying the pulses on the screen of a cathode ray tube, having a signal pulse input connected to the transducer output;

(b) means for increasing the intensity of the cathode ray when the height of a pulse envelope exceeds the lower threshold level; and (c) means for decreasing the cathode ray intensity when the height of a pulse envelope exceeds the upper threshold level.

3. A particle studying device as recited in claim 1 comprising in addition:

means for triggering the flip-flop means out of the veto state after the generation of an allow pulse by the univibrator means.

4. A particle studying device as recited in claim 1 comprising in addition:

means for preventing the transmission of an allow pulse to the input of the "AND" circuit from the output of the univibrator means until the flip-flop means is triggered out of the veto state.

5. A particle studying device as recited in claim 1 comprising in addition:

(a) means for supplying a reference signal to the upper threshold level set means and the lower threshold level set means; and (b) means for varying the threshold levels in response to changes in the reference signal whereby the adverse effects on the device caused by changes in the power line voltage are automatically compensated for.

References Cited by the Examiner

UNITED STATES PATENTS

| 2,551,529 | 5/1951 | Davis et al. | 328—117 |
| 2,820,895 | 1/1958 | Johnstone | 328—117 |
| 2,837,640 | 6/1958 | Goldsworthy | 328—117 |

OTHER REFERENCES

Berg, Robert H., ASTM Special Techanical Pub. No. 234, Symposium on Particle Size Measurement, pp. 245–258. Presented at the Sixty-First Annual Meeting of the American Society of Testing Materials, Boston, Mass., June 1958, published by the American Society for Testing Materials, 1916 Race St., Phila. 3, Pa.

WALTER L. CARLSON, *Primary Examiner.*

C. F. ROBERTS, *Assistant Examiner.*